(12) United States Patent
Chakrapani et al.

(10) Patent No.: US 9,900,838 B2
(45) Date of Patent: Feb. 20, 2018

(54) METHOD AND SYSTEM FOR SELECTING AN OPTIMAL DRX CONFIGURATION

(71) Applicant: Samsung Electronics Co., Ltd, Gyeonggi-do (KR)

(72) Inventors: Aravind Surapura Chakrapani, Bridgewater, NJ (US); Karthik Rangaraj Manavalan, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 15/029,620

(22) PCT Filed: Oct. 7, 2014

(86) PCT No.: PCT/KR2014/009432
§ 371 (c)(1),
(2) Date: Apr. 14, 2016

(87) PCT Pub. No.: WO2015/056920
PCT Pub. Date: Apr. 23, 2015

(65) Prior Publication Data
US 2016/0234780 A1   Aug. 11, 2016

(30) Foreign Application Priority Data

Oct. 14, 2013 (IN) .......................... 4626/CHE/2013

(51) Int. Cl.
*H04W 52/02* (2009.01)
*H04W 76/04* (2009.01)

(52) U.S. Cl.
CPC ....... *H04W 52/0216* (2013.01); *H04W 52/02* (2013.01); *H04W 76/048* (2013.01); *Y02B 60/50* (2013.01)

(58) Field of Classification Search
None
See application file for complete search history.

(56) References Cited

U.S. PATENT DOCUMENTS 7,564,810 B2    7/2009 Hernandez et al.
7,898,954 B2    3/2011 Prakash
(Continued)

FOREIGN PATENT DOCUMENTS

EP        2519060 A1    10/2012
WO    WO 2015/056920 A1 *  4/2015    ............ H04W 24/02

OTHER PUBLICATIONS

International Search Report dated Dec. 29, 2014 in connection with International Patent Application No. PCT/KR2014/009432, 3 pages.
(Continued)

*Primary Examiner* — Kwang B Yao
*Assistant Examiner* — Adam Duda

(57) ABSTRACT

A method and system for selecting an optimal DRX configuration for a User Equipment (UE) in a communication network is provided. An expression for expected maximum delay experienced by a packet arriving during the off-duration is derived for any packet arrival process (either known arrival process or unknown arrival process). Further, the method for computing the active duration in any DRX cycle with the expected delay to be less than a given threshold by considering all the timers in the communication network is provided. The DRX cycle configuration with minimum active duration is selected as optimal DRX configuration by the UE and UE informs the optimal DRX configuration to the network.

20 Claims, 3 Drawing Sheets

(56) References Cited

U.S. PATENT DOCUMENTS

| | | | |
|---|---|---|---|
| 2008/0181127 A1 | 7/2008 | Terry et al. | |
| 2010/0110896 A1 | 5/2010 | Tseng et al. | |
| 2010/0144299 A1* | 6/2010 | Ren | H04B 1/1615 |
| | | | 455/226.1 |
| 2010/0309798 A1* | 12/2010 | Fodor | H04W 52/06 |
| | | | 370/252 |
| 2012/0120815 A1* | 5/2012 | Anderson | H04W 76/048 |
| | | | 370/252 |
| 2013/0045770 A1 | 2/2013 | Aschan et al. | |
| 2013/0064151 A1 | 3/2013 | Mujtaba et al. | |
| 2013/0201852 A1 | 8/2013 | Chou et al. | |
| 2014/0269480 A1* | 9/2014 | Han | H04W 52/0216 |
| | | | 370/311 |
| 2014/0295820 A1* | 10/2014 | Kim | H04W 52/0216 |
| | | | 455/418 |

OTHER PUBLICATIONS

Written Opinion of the International Searching Authority dated Dec. 29, 2014 in connection with International Patent Application No. PCT/KR2014/009432, 6 pages.

* cited by examiner

[Fig. 1]
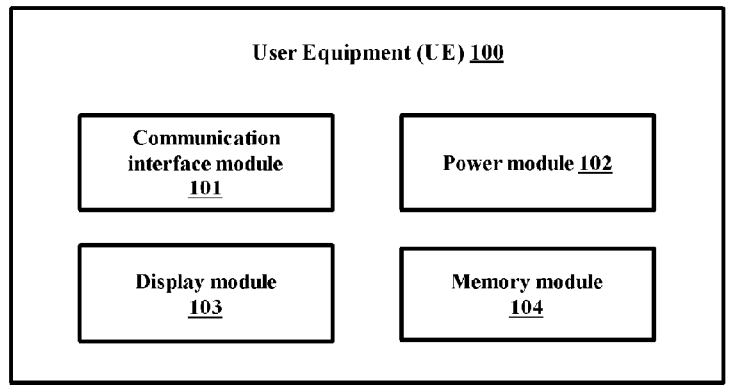
[Fig. 2]
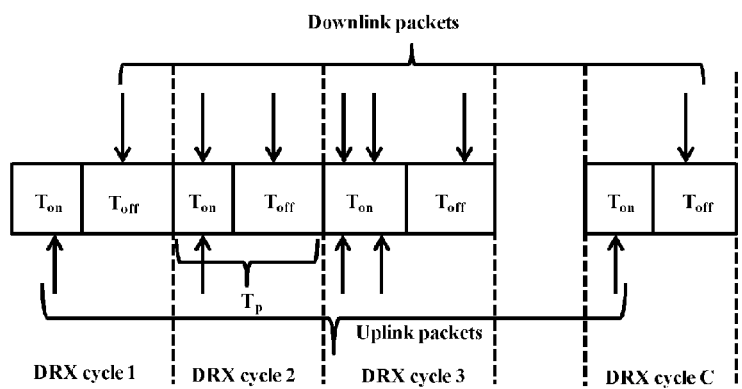
[Fig. 3]
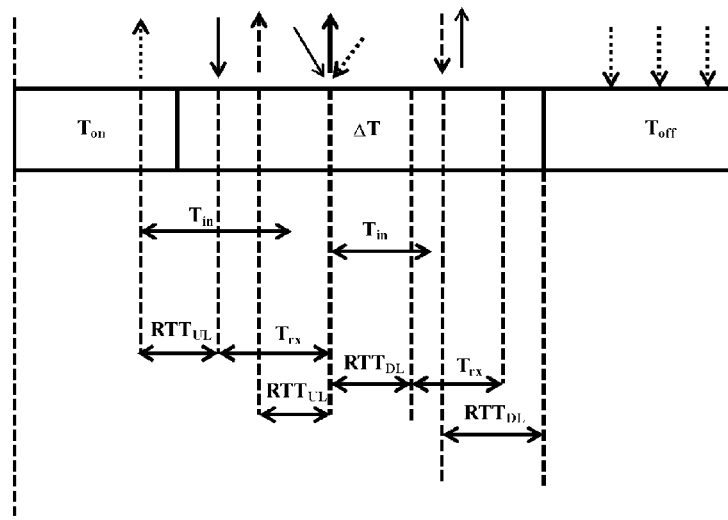

[Fig. 4]
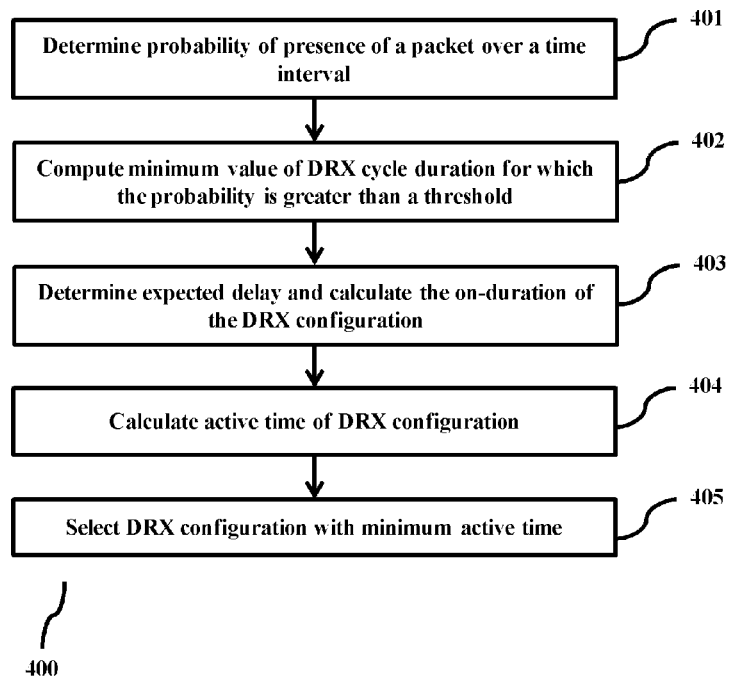
[Fig. 5]
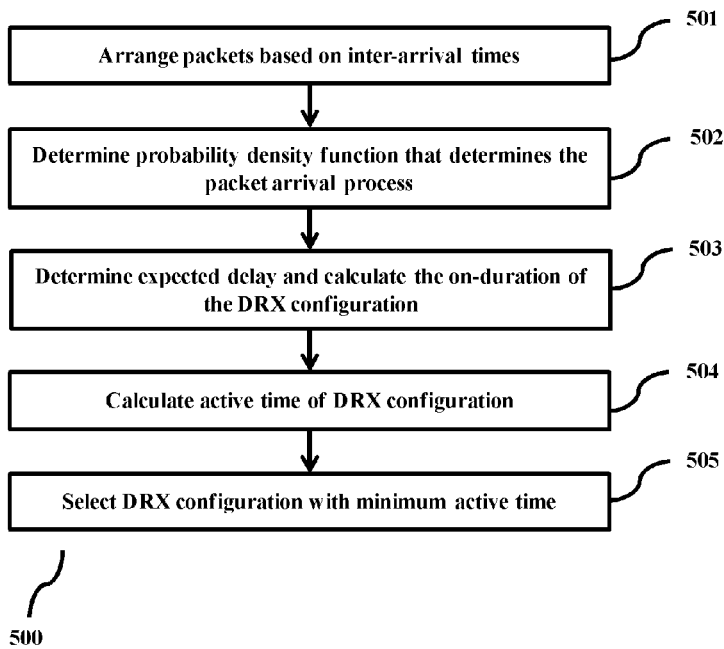

[Fig. 6]
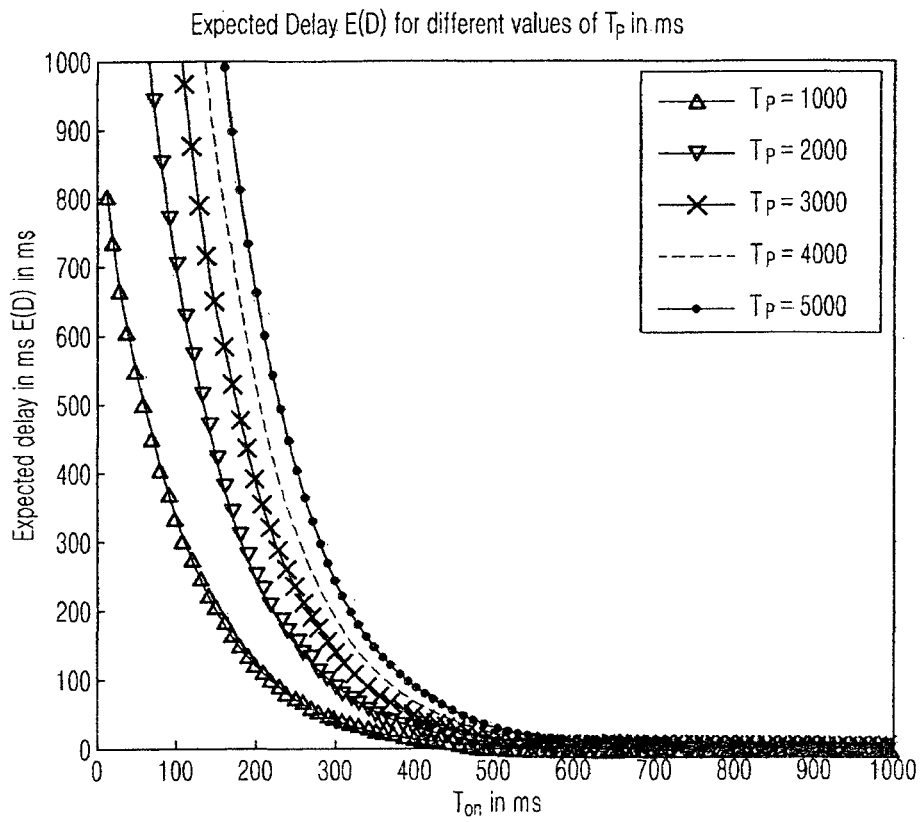
E(D) versus $T_{on}$ for different values fo $T_p$ (in ms)
[Fig. 7]
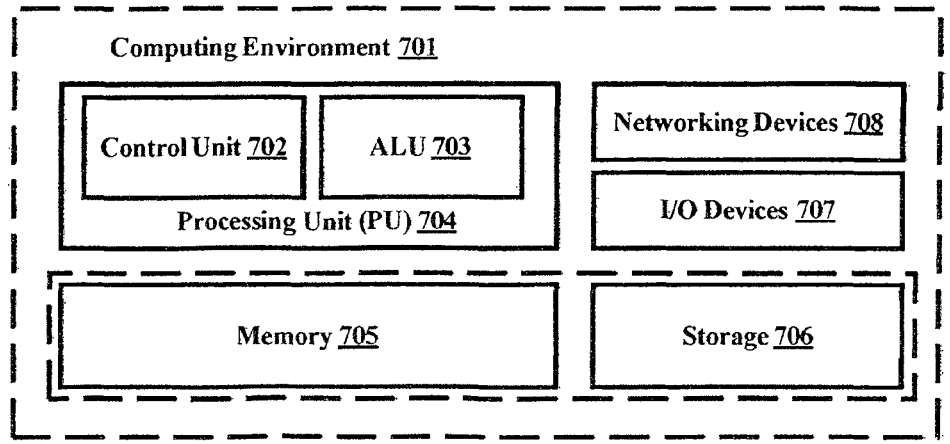

METHOD AND SYSTEM FOR SELECTING AN OPTIMAL DRX CONFIGURATION

CROSS-REFERENCE TO RELATED APPLICATION(S)

The present application claims priority under 35 U.S.C. § 365 to International Patent Application No. PCT/KR2014/009432 filed Oct. 7, 2014, entitled "A METHOD AND SYSTEM FOR SELECTING AN OPTIMAL DRX CONFIGURATION", and, through International Patent Application No. PCT/KR2014/009432, to Indian Patent Application No. 4626/CHE/2013 filed Oct. 14, 2013, each of which are incorporated herein by reference into the present disclosure as if fully set forth herein.

TECHNICAL FIELD

The present invention relates to field of wireless communication networks and more particularly relates to a method and system for selecting an optimal Discontinuous Reception (DRX) configuration for a User Equipment (UE) in the wireless communication network.

BACKGROUND ART

The 3rd Generation Partnership Project (3GPP), acting as an important organization in mobile communication field, greatly pushes the standardization of Third Generation (3G) techniques and has proposed a series of standards including Wide Code Division Multiple Access (WCDMA), High Speed Downlink Packet Access (HSDPA), High Speed Uplink Packet Access (HSUPA) and so on.

Along with the development of communication techniques towards mobility and broadband, power saving problem of User Equipment (UE) has attracted widespread attention. Many communication standard organizations have considered the power saving problem, when making relevant standards. In particular, access networks of future mobile communication systems will be based on Internet Protocol (IP) technique for data transmission. The burst of IP packets and the share of transmission channels among users make the data arrived at the UE in a discontinuous manner. Therefore, it becomes more important to save battery power of the UE.

In the mobile communication system, information exchange between the UE and an access network relies on power supply of both sides. The UE can be a cell phone, laptop and Personal Digital Assistant (PDA) and the like which runs on battery power. Therefore, to lower power consumption and prolong standby and service time of the UE become a key problem for designing the mobile communication system. In order to lower the power consumption of the UE, Discontinuous Reception (DRX) mode is employed in 3GPP standard. In particular, in the DRX mode, the UE monitors a channel and receives downlink services in a pre-defined time interval negotiated with the access network, thereby reducing unnecessary time for monitoring the channel and reducing power consumption of the UE.

In operation, when the UE is connected to a network, the UE and the network negotiate the connection details. In some systems, the UE will enter a "sleep" state and wake periodically to "listen" for paging messages, or be in an active state when a paging message can be received. When sleep states are used, part of the negotiation of the UE with the network may be to determine and set a sleep period, or a period of in-activity. Thus, the network knows when the UE will be expecting paging signals, and can transmit paging signals during a period of time when the UE will be listening for such paging signals.

In current systems, the sleep period negotiated between the UE and the wireless network is fixed. The sleep period may be set according to a profile set up on the UE, and may be different for different types of UE and so on. However, generally, once the sleep period is set by the network, the period is fixed. Also, a sleep period that is too long may result in unnecessary or even unacceptable levels of delay in receiving a paging signal. On the other hand, a sleep period that is too short may significantly reduce the operating life of the battery in the UE (i.e., by depleting battery power by waking up too frequently).

With huge data and longer battery life requirements, efficient power utilization at the UE is critical in current generation wireless networks like Long Term Evolution (LTE) and LTE-Advanced (LTE-A). LTE also supports DRX to allow the UE to save battery power consumption by exploiting the bursty nature of packet arrival, while maintaining minimal packet-delay. The UE can be in two different states, RRC_CONNECTED and RRC_IDL. In the former state, there is a connection established between the UE and the Radio Resource Controller (RRC) and data transfer between UE and the evolved NodeB (eNB) can take place. If there is no data traffic for longer than a specified time, then DRX can be configured by the RRC where the UE is in RRC_CONNECTED state with multiple background applications running.

The UE with DRX functionality enabled monitors the Physical Downlink Control Channel (PDCCH) discontinuously. During each DRX cycle of length Tp, the UE monitors the PDCCH for a duration Ton (on-duration), and then enables the power-down mode for Toff (off-duration), thereby reducing the battery power consumption. Further, with the applications generating uplink (UL) and receiving downlink (DL) packets according to random distributions. With DRX, packets arriving during Toff experience delay in reception or transmission. A higher value of Toff results in lower power consumption, but it increases the delay experienced and therefore there exists a trade-off.

DISCLOSURE OF INVENTION

Technical Problem

The principal object of the embodiments herein is to provide a method and system for selecting an optimal Discontinuous Reception (DRX) configuration for a User Equipment (UE) in a communication network.

Another object of the invention is to provide a method and system for selecting an optimal DRX configuration when the arrival processes of the packets are either known or unknown.

Another object of the invention is to provide a method and system that provides a mechanism for selecting the most suitable DRX configuration which meets the required delay constraints when multiple applications are running in the background of the UE.

Solution to Problem

Accordingly the invention provides a method for selecting an optimal Discontinuous Reception (DRX) configuration for a User Equipment (UE) in a communication network, wherein the method comprises characterizing packet delay as a function of DRX cycle duration and a random variable by the UE, wherein the random variable indicates inter-arrival time between packets. The method further comprises determining expected delay for a plurality of packets based on at least one random variable. Further, the method comprises evaluating on-duration of the DRX configuration for which the determined expected delay is less than minimum of delay constraints of at least one application running in background of the UE. The method further comprises computing active time of the DRX configuration based on the evaluated on-duration and selecting the optimal DRX configuration with minimum active time by the UE.

Accordingly the invention provides a Radio Access network (RAN) for selecting an optimal Discontinuous Reception (DRX) configuration for a User Equipment (UE) in a communication network, wherein the network is configured to characterize packet delay as a function of DRX cycle duration and a random variable by the network, wherein the random variable indicates inter-arrival time between packets. Further, the network is configured to determine expected delay for a plurality of packets based on at least one random variable. Further, the network is configured to evaluate on-duration of the DRX configuration for which the determined expected delay is less than minimum of delay constraints of at least one application running in background of the UE and the network is further configured to compute active time of the DRX configuration based on the evaluated on-duration and selecting the optimal DRX configuration with minimum active time for the UE.

Accordingly the invention provides a User Equipment (UE) for selecting an optimal Discontinuous Reception (DRX) configuration, wherein the UE comprises an integrated circuit. Further the integrated circuit comprises at least one processor and at least one memory. The memory comprises a computer program code within the circuit. At least one memory and the computer program code with the at least one processor cause the UE to characterize packet delay as a function of DRX cycle duration and a random variable, wherein the random variable indicates inter-arrival time between packets. Further, the UE is configured to determine expected delay for a plurality of packets based on at least one random variable. The UE is further configured to evaluate on-duration of the DRX configuration for which the determined expected delay is less than minimum of delay constraints of at least one application running in background of the UE. Further, the UE is configured to compute active time of the DRX configuration based on the evaluated on-duration and selecting the optimal DRX configuration with minimum active time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates the block diagram of a user equipment with various modules, according to embodiments as disclosed herein, according to the embodiments as disclosed herein;

FIG. 2 illustrates the structure of DRX cycles, according to the embodiments as disclosed herein;

FIG. 3 illustrates the DRX cycle with the presence of timers, according to the embodiments as disclosed herein;

FIG. 4 illustrates a flow diagram explaining the various steps involved in selecting the DRX configuration when the packet arrival process is known, according to the embodiments as disclosed herein;

FIG. 5 illustrates a flow diagram explaining the various steps involved in selecting the DRX configuration when the packet arrival process is unknown, according to the embodiments as disclosed herein;

FIG. 6 is a graph that shows the behavior of expected delay and on-duration based on the DRX cycle duration, according to the embodiments as disclosed herein; and FIG. 7 illustrates a computing environment implementing the method and system for selecting the optimal DRX configuration for the user equipment, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for selecting an optimal DRX configuration for a User Equipment (UE) in a communication network. An expression for expected maximum delay experienced by a packet arriving during the off-duration is derived for any packet arrival process (either known arrival process or unknown arrival process).

Further, the method for computing the active duration in any DRX cycle with the expected delay to be less than a given threshold by considering all the timers in the communication network is provided.

Referring now to the drawings, and more particularly to FIGS. 1 through 7, where similar reference characters denote corresponding features consistently throughout the figures, there are shown preferred embodiments.

FIG. 1 illustrates the block diagram of a user equipment with various modules, according to embodiments as disclosed herein, according to the embodiments as disclosed herein. As depicted in the figure, the user equipment (UE) 100 comprises a communication interface module 101, a power module 102, a display module 103 and a memory module 104. The communication interface module 101 helps the UE to connect to the wireless network. The power module 102 holds the battery information and status of battery power in the user equipment 100. The battery information comprises the amount of charge that the device possesses and the time period for which the user equipment 100 will be in operation and so on. The display module 103 of the user equipment 100 comprises of a user interface which can be a virtual keypad or through any other means by which a user can input some data into the user equipment 100. The memory module 104 may include a random access memory (RAM) or another type of dynamic storage device that may store information and instructions, for example an application, for execution by processor, a read-only memory (ROM) device or another type of static storage device.

FIG. 2 illustrates the structure of DRX cycles, according to the embodiments as disclosed herein. As depicted in the figure, the UE 100 with DRX functionality enabled monitors the Physical Downlink Control Channel (PDCCH) discontinuously. During each DRX cycle of length Tp, the UE 100 monitors the PDCCH for a duration Ton (on-duration), and then enables the power-down mode for Toff (off-duration), thereby reducing the battery power consumption.

The DRX cycles of length Tp=Ton+Toff with applications generating uplink (UL) and receiving downlink (DL) packets according to random distributions are shown in the figure.

With DRX, packets arriving during Toff experience delay in reception or transmission. A higher value of Toff results in lower power consumption, but it increases the delay experienced by the packets and therefore there exists a trade-off.

FIG. 3 illustrates the DRX cycle with the presence of timers, according to the embodiments as disclosed herein. The figure depicts the DRX cycle with different timers associated with it and their influence on the on-duration of the DRX cycle based on the packet arrival process.

As shown in the figure, the DRX cycle comprises on-duration, inactivity-timer (Tin), Round Trip Time (RTT) timer, retransmission-timer (Trx) and DRX-short cycle-timer.

'Tin' specifies the number of consecutive PDCCH subframes the UE should be awake after successfully decoding a PDCCH, indicating a new UL or DL data transmission.

Further, 'Tin' keeps the UE 100 awake when there are new data packets expected. 'Tin' is re-started on the arrival of each subsequent new packet. Due to the arrival of new packets, and Tin, the duration of Ton can be extended by an amount ΔT as shown in the figure.

The sum of Ton and ΔT gives the total time for which the UE is awake and is represented as the active duration, Tactive.

The RTT-timer and the Trx also contribute to the active duration. The RTT-timer specifies the minimum amount of subframes before a retransmission is expected by the UE 100 and the UE 100 can go to sleep during this time. At the end of RTT, if negative-acknowledgment (NACK) is received, the Trx is started.

'Trx' specifies the maximum number of consecutive PDCCH subframes where a retransmission is expected by the UE after the first available retransmission time. Further, if an acknowledgment (ACK) is received, then Trx is not started. The active time includes Ton, time when UE is monitoring PDCCH due to Tin, UL grant reception and Trx.

In the figure, RTTUL and RTTDL denote the UL and DL RTT timer values respectively and these values are fixed.

In the present systems, the DRX configuration consisting of the values of Tp, Ton, Tin, and Trx is provided to the UE by the base station (eNB). These values provided by the base station are fixed and leads to the wastage of battery power of the UE 100.

Due to the above mentioned reason, the UE 100 can suggest the optimal DRX configuration from the available DRX configurations to the eNB. The method for selecting the optimal DRX configuration that maximizes the power savings with an acceptable delay is provided herein RTT timer.

Initially, an expression for expected delay in the absence of the timers is derived. Consider a system where the inter-arrival time between packets is represented by a Random Variable (RV) W and with a probability density function fw(w). The maximum packet delay 'D' is characterized as a function of Tp, fw(w) and the expected maximum delay E(D) is computed. In this case, the E(D) is computed in the absence of timers (Tin=RTTUL=RTTDL=Trx=0).

Using the expected delay E(D), an initial estimate of on-duration (denoted as Ton*) is calculated for which the E(D) is less than a given threshold. Further, the Ton* is used to determine the active time (Tactive) in the presence of timers of the communication network.

It is assumed that the packets arriving during Ton experience zero delay (as the UE 100 is active to receive the packets). The maximum packet delay 'D' is defined as the time form the first packet arrival during Toff to the end of that DRX cycle. The delay D can be computed as $$D = \{Tp - \mod(W, Tp)\} I\{\mod(W, Tp) > Ton\}, \quad (1)$$

where mod(.) is the modulo operator and IA(x) is the indicator RV defined by $$I_A(x) = \begin{cases} 1, & x \in A \\ 0, & \text{otherwise.} \end{cases} \quad (2)$$

For determining E(D), the random variables Y and Z are defined as $$Y = \mod(W, Tp) \quad (3)$$

$$Z = I\{\mod(W, Tp) > Ton\} \quad (4)$$

Using the equations 3 and 4, the expected delay E(D) can be written as $$E(D) = TpE(Z) - E(YZ) \quad (5)$$

Equation (3) gives the reminder of (W/Tp) and can be rewritten as $$Y = W - \left\lfloor \frac{W}{T_p} \right\rfloor T_p \quad (6)$$

For finding the Probability Density Function (PDF), the RV G is defined as $$G = \left\lfloor \frac{W}{T_p} \right\rfloor \quad (7)$$

'G' is a discrete RV and has a Probability Mass Function (PMF) denoted by PG(g). The PG(g) gives the probability that G=g and it is denoted as P(G=g). It can be evaluated as $$P(G = g) = P(g <= W/Tp < (g+1)) \quad (8)$$

$$= P(g \, Tp <= W < (g+1)Tp) \quad (9)$$

$$= \int_{gTp}^{(g+1)Tp} fw(w) \, dw \quad (10)$$

Substituting $X=-T_p G$ in Equation (6), we get $Y=W+X$. The PMF of X, pX(x) is given by, $$pX(x) = P(X = x) = P(-T_p G = x) \quad (11)$$

$$= P(G = -x/T_p) \; x = 0, -T_p, -2T_p \quad (12)$$

'X' can have values which are negative integer multiples of Tp. X is a discrete RV, whereas W is continuous. In this case, the joint distribution of Y=W+X is not defined by a joint PMF or a joint PMF, but by a combination of the two. Applying the properties of mod(.), Y can be written as $$Y = \begin{cases} 0, & W = (g-1)T_p \\ 0, & W = gT_p \\ W - (g-1)T_p, & (g-1)T_p < W < gT_p \end{cases} \quad (13)$$

For finding the cumulative density function (cdf) of Y, FY(y), the joint distribution of Y and G is determined. $P(Y \leq y\, G=g)$, g=1, 2 . . . is the conditional cdf of Y given G=g.

Given $P(Y \leq Y\, G=g-1)$, the joint distribution of Y and G is calculated as $$P(Y \leq y, G = g-1) = \frac{P(Y \leq y \mid G = g-1)}{P(G = g-1)} \quad (14)$$

Multiplying Equation (14) by P(G=g−1), $$P(Y \leq y, G=g-1)P(G=g-1) = P(W-(g-1)T_p \leq y) \quad (15)$$

For evaluating the Right Hand Side (R.H.S) of equation (15), the function fw(w) is integrated between (g−1)Tp and y+(g−1)Tp.

$$P(W \leq y + (g-1)T_p) = \int_{(g-1)T_p}^{y+(g-1)T_p} f_W(w)\,dw. \quad (16)$$

Summing the equation (16) for all the values of 'g' results in Fy(y), given by $$F_Y(y) = P(Y \leq y) = \sum_{g=1}^{\infty} \int_{(g-1)T_p}^{y+(g-1)T_p} f_W(w)\,dw \quad (17)$$

Further, differentiating the equation (17) w. r.t. y, yields the PDF of Y, fY(y) given by $$f_Y(y) = \sum_{g=1}^{\infty} f_W(y + (g-1)T_p) \quad (18)$$

Equation (18) is valid for any packet arrival process. The expected delay E(D) is given by equation (5). For determining E(YZ) in equation (5), the joint PDF fy,z(y, z) is defined as $$f_{Y,Z}(y,z) = p_{Z|Y}(z|y) f_Y(y) \quad (19)$$

Where pz|Y(z|y) is the conditional PMF of Z given Y. The probability that Z takes value 0 given Y can be evaluated as $$P(Z=0|Y) = P(Y \leq T_{on}) \quad (20)$$

Similarly, the probability that Z takes value 1 given Y can be evaluated $$P(Z=1|Y) = P(Y > T_{on}) \quad (21)$$

Hence, E(YZ) is given by $$E(YZ) = \int_0^{T_p} \sum_{z=0}^{1} z p_{Z|Y}(z \mid y) y f_Y(y)\, dy \quad (22)$$

$$= \int_0^{T_p} P(Y > T_{on}) y f_Y(y)\, dy \quad (23)$$

$$= \int_0^{T_p} \left( \int_{T_{on}}^{T_p} f_Y(a)\, da \right) y f_Y(y)\, dy. \quad (24)$$

Let $\int_{T_{on}}^{T_p} f_Y(a)\,da$. 'b' is a constant independent of Y, and therefore can be taken out of integral equation (24).

In addition, $\int_0^{T_p} y f_y(y)\,dy$ is E(Y). Therefore, $$E(YZ) = bE(y) \quad (25)$$

E(Z) is given by $$E(Z) = E\{I_{\{mod(W,T_p) > T_{on}\}}\} \quad (26)$$

$$= P(\mathrm{mod}\,(W, T_p) > T_{on}) = b. \quad (27)$$

Substituting Equations (25) and (27) in equation (5), the expected delay E(D) can be given by $$E(D) = (T_p - E(Y))E(Z) \quad (28)$$

From the above equation (28), the expected delay E(D) can be calculated for any arrival process.

In the above equations, while deriving E(D), all the timers of 3GPP are ignored. The influence of DRX timers on Tactive is as detailed herein.

The T*on for which E(D) is below a certain value (threshold) serves as an initial estimate and T(c)active in the DRX cycle 'c' can be represented as $$T_{active}^{(c)} = B(T^*_{on}, T_{in}, T_{rx}, RTT_{DL}, RTT_{UL}, f_W(w)) \quad (29)$$

Where B(.) is a time varying function of T*on, Tin, Trx, RTTDL, RTTUL and fw(w).

The effect of Tin is considered alone and the expected Tactive is derived as described below.

The in-activity timer (Tin) extends the duration for which the UE 100 is in active state monitoring the PDCCH. Consider that the t1(c), t2(c), . . . denote the inter-arrival times between new packets in the DRX cycle 'c'. On each arrival of a new packet, Tin is restarted. If t1(c)>T*on then ΔT$^{(c)}$=0.

If t1(c)<T*on, then Tin is restarted each time t1(c)<=Tin. The UE 100 can enter into sleep mode for the first time ti(c) becomes greater than Tin and $\Sigma_{j-1}^{i} t_i^{(c)} < T_p$.

Let N(c) denotes the number of the packet whose arrival happens after Tin has expired. It can be shown that the number of packets which have arrived before Tin expires (N(c)−1) is a geometric RV. Due to Tin, Ton in the DRX cycle 'c' is extended by an amount ΔT$^{(c)}$.

The exact value of ΔT$^{(c)}$ is determined as explained herein. If t1(c)>T*on, then the first packet arrives after Ton*. Therefore, the UE 100 is in off state. Hence ΔT$^{(c)}$=0.

If the first packet arrives before T*on, then Tin is restarted till the inter-arrival time between packets exceeds Tin for the first time.

If this happens after Tp, then Tactive encompasses the complete DRX cycle. Therefore, $\Delta T^{(c)}$=Tp−Ton(c) and Ton (c) may be modified because of extension of Tin into the next DRX cycle. Otherwise, $\Delta T^{(c)}$ is the difference between the sum of inter-arrival times and Tin, and Ton(c).

Summarizing the above described explanation, $$\Delta T^{(c)} = \begin{cases} 0, \text{ if } t_1^{(c)} > T_{on}^{(c)} \\ T_p - T_{on}^{(c)}, \text{ if } \sum_{i=1}^{N^{(c)}-1} t_i^{(c)} \geq T_p - T_{in} \\ T_{in} + \sum_{i=1}^{N^{(c)}-1} t_i^{(c)} - T_{on}^{(c)}, \text{ otherwise,} \end{cases} \quad (30)$$

Where Ton(c) is $$T_{on}^{(c)} = \begin{cases} T_{on}^*, \text{ if } \sum_{i=1}^{N^{(c-1)}} t_i^{(c-1)} < T_p + T_{on}^*, \\ \sum_{i=1}^{N^{(c-1)}} t_i^{(c-1)} - T_p, \text{ otherwise,} \end{cases} \quad (31)$$

And where Ton(1)=Ton*. Tp is selected from a set of possible configurations defined in 3GPP.

The influence of other timers (Round Trip Time (RTT) timer and retransmission timers (RTX)) on the active time of the DRX cycle is as described herein.

In addition to the in-activity timer, the effect of Round Trip Timer (RTT) and retransmission timer (rtx) on overall length of active duration denoted as $T_{active}^{(c)}$.

Consider that $\Delta T_1^{(c)} = \Delta T^{(c)}$ (as given in the equation (30)) be the extension in Ton(c) due to Tin. Let $\Delta T_2^{(c)}$ be the extension in $T_{on}^{(c)}$ due to RTT timer and receipt of an ACK packet at the end of RTT timer. The Trx is not started on the receipt of an ACK packet. Let $\Delta T_3^{(c)}$ be the extension in $T_{on}^{(c)}$ due to RTT timer and Trx (started upon the receipt of NACK packet. The $T_{active}^{(c)}$ can be written as $$T_{active}^{(c)} = T_{on}^{(c)} + \Delta T_1^{(c)} + \Delta T_2^{(c)} + \Delta T_3^{(c)} \quad (32)$$

For a given, Tp, $T_{off}^{(c)}$ is obtained as $T_{off}^{(c)}$=Tp−$T_{active}^{(c)}$. The value of $\Delta T_2^{(c)}$ is associated with the probability of successful reception of a packet, whereas $\Delta T_3^{(c)}$ is associated with the probability of failure and the value of Trx.

With the background applications, typically keep alive packets are exchanged with the associated server and their payload is small. For example, a typical TCP keep alive frame is of length 60 bytes, resulting in high probability of successful reception.

Therefore, the effect of $\Delta T_3^{(c)}$ on Tactive is negligible. If RTTDL is less than or equal to Tin, then $\Delta T_2^{(c)}$=0. Otherwise, it contributes a maximum of d ms in each DRX cycle, where 'd' is a time varying function of W, $\Delta T_1^{(c)}$, RTT timer.

In the above described method, the expected delay is calculated when there is a single arrival process and distribution of the arrival process is known. In real time scenarios, the PDF of the packet arrival process is typically unknown, particularly when there are multiple applications running. A single application may generate packets according to a compound process. The method for selecting the optimal DRX configuration when the arrival distribution of individual applications is known is explained herein.

FIG. 4 illustrates a flow diagram explaining the various steps involved in selecting the DRX configuration when the packet arrival process is known, according to the embodiments as disclosed herein. The flow diagram 400 provides the method for selecting the optimal DRX configuration for the UE 100 when the packet arrival process is known. Initially, the UE 100 is configured to determine (401) the probability of presence of a packet over a time interval (say for example (0, t]).

For example, consider a scenario where traffic (say for example from Skype) runs in the background of the UE 100 and new voice packets arrive according to a known distribution (say Poisson distribution), Nc(t) with parameter λt. The probability that there are m new voice packets in the interval (0, t] is given by $$P(N_c(t) = m) = \frac{e^{-\lambda t}(\lambda t)^m}{m!} \quad (33)$$

In an embodiment, some packets have atypical lengths and do not belong to Skype. The corresponding inter-arrival times of those packets are removed from the original packet inter-arrival times and the pruned packet inter-arrival time is obtained.

In an embodiment, a new packet can either be due to packet from Skype traffic or a new call, The PMF of the overall packet arrival process, N(t) can be obtained as explained below.

The probability that there are 'r' packets in (0, t] can be written as $$P(N(t) = r) = \sum_{i=0}^{r} P(N_s(t) = i) P(N_c(t) = r - i) \quad (34)$$

Further, the probability that there are at least r packets in (0, t] can be calculated as $$P(N(t) \geq r) = 1 - \sum_{i=0}^{r-1} \sum_{j=0}^{i} P(N_s(t) = j) P(N_c(t) = i - j) \quad (35)$$

The UE 100 is configured to determine (402) the minimum value of DRX cycle (Tp) for which the probability at the equation (35) ((P(N(t)>=r)) is greater than a threshold (say 0.9).

The above analysis can also be extended to a scenario where N applications produce data packets with different arrival rates using the equation (34). Once, the minimum value of DRX cycle is determined, the PDF of Y, fY(y) of the packet arrival process (where fY(y) is the PDF of packet inter-arrival time, Y) can be calculated using the equation (18).

Using the PDF, the UE 100 is configured to determine (403) the expected delay E(D). Initially the UE 100 is configured to determine E(Y) and E(Z) using the equations (25 and 26) respectively before determining the expected delay E(D).

Further, the UE 100 is configured to calculate the on-duration of the DRX configuration. In an embodiment, the on-duration (Ton*) computed by the UE 100 such that the expected delay E(D) is less than the minimum delay of all the applications that are running on the background of the UE 100.

When the Ton* is determined, the UE 100 is configured to calculate (404) the active time of DRX configuration using Ton*.

In an embodiment, the active time of DRX configuration is computed is computed by considering the effect of timers in the communication network (3GPP timers). The active time ($T_{active}^{C'}$) of the DRX configuration is determined using the equation (32).

Finally, the UE 100 is configured to select (405) the DRX configuration with minimum Tactive. The various actions in flow diagram 400 may be performed in the order presented, in a different order or simultaneously. Further, in some embodiments, some actions listed in FIG. 4 may be omitted.

FIG. 5 illustrates a flow diagram explaining the various steps involved in selecting the DRX configuration when the packet arrival process is unknown, according to the embodiments as disclosed herein. The flow diagram 500 describes the procedure for determining the arrival process and selecting the optimal DRX configuration for the UE 100 when the packet arrival process is unknown.

For example, consider a scenario where the arrival processes of the packets of the individual applications is unknown resulting in a compound arrival process.

Initially, the UE 100 is configured to arrange (501) the packets based on inter-arrival times.

In an embodiment, the UE 100 is configured to combine the packets from the applications running in the background of the UE 100. In an embodiment, the packets are time stamped and combined based on any ordering procedure O(.).

The UE 100 is configured to determine (502) the probability density function (PDF) for determining the packet arrival process. The UE 100 determines the PDF (fw(w)), where 'w' represents the inter-arrival time between the packets.

The PDF can be determined using the equation (18).

In an embodiment, the determined PDF at step 502 is verified using Kolmogorov-Smirnov (KS) test. If the determined PDF is valid, then the fy(y) for a given DRX cycle (Tp) is determined.

Using the fy(y), the UE 100 is configured to determine (503) the expected delay E(D). Initially the UE 100 is configured to determine E(Y) and E(Z) using the equations (25 and 26) respectively before determining the expected delay E(D).

Further, the UE 100 is configured to determine the on-duration of DRX configuration for which the determined expected delay (E(D)) is below a given threshold.

In an embodiment, the on-duration (Ton*) computed by the UE 100 such that the determined expected delay E(D) is less than the minimum delay of all the applications that are running on the background of the UE 100.

When the Ton* is determined, the UE 100 is configured to calculate (504) the active time of DRX configuration using Ton*.

The active time of DRX configuration is computed by considering the effect of timers in the communication network (3GPP timers). The active time ($T_{active}^{C'}$) of the DRX configuration is determined using the equation (32).

For all the allowable values of the DRX cycle duration (TP), the steps 502, 503 and 504 are repeated and the UE 100 is configured to select (505) the DRX configuration for which Tactive is minimum. The various actions in flow diagram 500 may be performed in the order presented, in a different order or simultaneously. Further, in some embodiments, some actions listed in FIG. 5 may be omitted.

FIG. 6 is a graph that shows the behavior of expected delay and on-duration based on the DRX cycle duration, according to the embodiments as disclosed herein. The graph shown in the figure is plotted for an exponential inter-arrival time of packets.

Consider a scenario, where the inter-arrival time of packets follows an exponential distribution with 'W' as inter-arrival times and with a mean of $1/\lambda$. The PDF fw(w) is given by $$f_W(w) = \lambda e^{-\lambda w}, \ w \geq 0 \qquad (36)$$

P(G=g) is given by $$P(G=g) = e^{-g\lambda T_p}(1 - e^{-\lambda T_p}) \qquad (37)$$

A geometric random variable (RV) is given by $$P_E(g) = (1-p)^g p, \ g = 0, 1, 2 \qquad (38)$$

By comparing the equations (37) and (38), it can be observed that the 'G' follows a geometric distribution with parameter $P = 1 - e^{-\lambda T_p}$ and is defined at g=0, 1, 2, . . . .

The PMF of X=−TpG. Px(x) can be expressed as $$p_X(x) = e^{\lambda x}(1 - e^{-\lambda T_p}), \ x = 0, -T_p, -2T_p, \ldots \qquad (39)$$

Comparing the equation (39) with (37), it can be observed that X follows a geometric distribution but is defined on negative axis. Evaluating the R.H.S of equation (15), $$P(W \leq y + (g-1)T_p) = \int_{(g-1)T_p}^{y+(g-1)T_p} f_W(w)dw \qquad (40)$$
$$= e^{-\lambda(g-1)T_p}(1 - e^{-\lambda y})$$

Fy(y) is then evaluated as $$F_Y(y) = P(Y \leq y) = \sum_{g=1}^{\infty} e^{-\lambda(g-1)T_p}(1 - e^{-\lambda y}) \qquad (41)$$

Hence, fY(y) can be calculated as $$f_Y(y) = \lambda e^{-\lambda y} \sum_{g=1}^{\infty} e^{-\lambda(g-1)T_p} \qquad (42)$$

The equation (42) can be simplified to $$f_Y(y) = \lambda e^{-\lambda y} \frac{1}{1 - e^{-\lambda T_p}}, \ 0 \leq y < T_p \qquad (43)$$

Further, E(Y) and E(Z) can be calculated as $$E(Y) = \frac{1}{\lambda} - \frac{T_p e^{-\lambda T_p}}{1 - e^{-\lambda T_p}}. \qquad (44)$$

$$E(Z) = \int_{T_{on}}^{T_p} f_Y(a) da$$
$$= \frac{e^{-\lambda T_{on}} - e^{-\lambda T_p}}{1 - e^{-\lambda T_p}}.$$

Substituting the values of E(Y) and E(Z) in equation (28), the E(D) is calculated as $$E(D) = \left(T_p - \frac{1}{\lambda} + T_p \frac{e^{-\lambda T_p}}{1 - e^{-\lambda T_p}}\right) \frac{e^{-\lambda T_{on}} - e^{-\lambda T_p}}{1 - e^{-\lambda T_p}}. \quad (45)$$

The graph shown in the figure is plotted for the expected delay (E(D)) in equation (45) and Ton for different values of Tp for exponential inter-arrival time distribution of packets with λ=1/1000.

FIG. 7 illustrates a computing environment implementing the, according to the embodiments as disclosed herein. As depicted the computing environment 701 comprises at least one processing unit 704 that is equipped with a control unit 702 and an Arithmetic Logic Unit (ALU) 703, a memory 705, a storage unit 706, plurality of networking devices 708 and a plurality Input output (I/O) devices 707. The processing unit 704 is responsible for processing the instructions of the algorithm. The processing unit 704 receives commands from the control unit in order to perform its processing. Further, any logical and arithmetic operations involved in the execution of the instructions are computed with the help of the ALU 703.

The overall computing environment 701 can be composed of multiple homogeneous and/or heterogeneous cores, multiple CPUs of different kinds, special media and other accelerators. The processing unit 704 is responsible for processing the instructions of the algorithm. Further, the plurality of processing units 704 may be located on a single chip or over multiple chips.

The algorithm comprising of instructions and codes required for the implementation are stored in either the memory unit 705 or the storage 706 or both. At the time of execution, the instructions may be fetched from the corresponding memory 705 and/or storage 706, and executed by the processing unit 704.

In case of any hardware implementations various networking devices 708 or external I/O devices 707 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 and 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for selecting an optimal discontinuous reception (DRX) configuration for a user equipment (UE) in a communication network, wherein the method comprises:
   characterizing a packet delay as a function of a DRX cycle duration and a random variable by the UE, wherein the random variable indicates an inter-arrival time between packets;
   determining an expected delay for a plurality of packets based on the random variable;
   evaluating an on-duration of a DRX configuration for which the determined expected delay is less than a minimum of delay constraints of at least one application running in a background of the UE; and
   computing an active time of the DRX configuration based on the evaluated on-duration and selecting the optimal DRX configuration with a minimum active time by the UE.

2. The method as in claim 1, wherein the method further comprises communicating the selected optimal DRX configuration to a radio access network (RAN) by the UE.

3. The method as in claim 1, wherein: the active time of the DRX configuration is computed by considering an effect of at least one timer of the communication network, and the at least one timer comprises: an in-activity timer, a retransmission timer and a round trip timer.

4. The method as in claim 1, wherein the method further comprises determining a minimum value of the DRX cycle duration for which a probability of a presence of at least one packet within a time interval is greater than a threshold from all available DRX configurations when an arrival process of the at least one packet among the plurality of packets is known to the UE.

5. The method as in claim 4, wherein the method further comprises: determining the expected delay, evaluating the on-duration for which the expected delay is less than the minimum of the delay constraints of the at least one application running in the background of the UE, and computing the active time of the DRX configuration for the determined minimum value of the DRX cycle duration.

6. The method as in claim 1, wherein the method further comprises arranging at least one packet among the plurality of packets from the at least one application based on the inter-arrival time, and determining a probability density function (PDF) if an arrival process of the at least one packet from the at least one application is unknown, wherein the PDF represents a function of the inter-arrival time of the at least one packet over a time interval.

7. The method as in claim 6, wherein the method further comprises: determining the expected delay, evaluating the on-duration for which the expected delay is less than the minimum of the delay constraints of the at least one application running in the background of the UE, computing the active time of the DRX configuration based on the evaluated on-duration, and selecting the optimal DRX configuration with the minimum active time by the UE, wherein the active time of the DRX configuration is computed by considering an effect of timers of the communication network.

8. A radio access network (RAN) for selecting an optimal discontinuous reception (DRX) configuration for a user equipment (UE) in a communication network, wherein the RAN is configured to:
   characterize a packet delay as a function of a DRX cycle duration and a random variable by the communication network, wherein the random variable indicates an inter-arrival time between packets;
   determine an expected delay for a plurality of packets based on the random variable;

evaluate an on-duration of a DRX configuration for which the determined expected delay is less than a minimum of delay constraints of at least one application running in a background of the UE; and compute an active time of the DRX configuration based on the evaluated on-duration and select the optimal DRX configuration with a minimum active time for the UE.

9. The RAN as in claim 8, wherein the RAN is further configured to communicate the selected optimal DRX configuration to the UE.

10. The RAN as in claim 8, wherein: the active time of the DRX configuration is computed by considering an effect of at least one timer of the communication network, and the at least one timer comprises: an in-activity timer, a retransmission timer and a round trip timer.

11. The RAN as in claim 8, wherein the RAN is further configured to: determine a minimum value of the DRX cycle duration for which a probability of a presence of at least one packet within a time interval is greater than a threshold from all available DRX configurations when an arrival process of the at least one packet among the plurality of packets is known to the UE, determine the expected delay, evaluate the on-duration for which the expected delay is less than the minimum of the delay constraints of the at least one application running in the background of the UE, and compute the active time of the DRX configuration for the determined minimum value of the DRX cycle duration.

12. The RAN as in claim 8, wherein the RAN is further configured to: arrange the at least one packet among the plurality of packets from the at least one application based on the inter-arrival time, and determine a probability density function (PDF) if an arrival process of the at least one packet from the at least one application is unknown, wherein the PDF represents a function of the inter-arrival time of the at least one packet over a time interval.

13. The RAN as in claim 12, wherein the RAN is further configured to: determine the expected delay, and evaluate the on-duration for which the expected delay is less than the minimum of the delay constraints of the at least one application running in the background of the UE.

14. The RAN as in claim 12, wherein the RAN is further configured to: compute the active time of the DRX configuration based on the evaluated on-duration, and select the optimal DRX configuration with the minimum active time by the UE, wherein the active time of the DRX configuration is computed by considering an effect of timers of the communication network.

15. The UE as in claim 12, wherein said UE is configured to arrange said at least one packet among said plurality of packets from said at least one application based on said inter-arrival time and said UE is further configured to determine a probability density function (PDF) if arrival process of said at least one packet from said at least one application is unknown, wherein said PDF represents a function of said inter-arrival time of said at least one packet over a time interval.

16. The UE as in claim 15, wherein said UE is further configured to determine said expected delay and evaluate said on-duration for which said expected delay is less than minimum of delay constraints of said at least one application running in the background of said UE, and to compute said active time of said DRX configuration based on said evaluated on-duration and select said optimal DRX configuration with minimum active time by said UE, wherein said active time of said DRX configuration is computed by considering the effect of timers of said communication network.

17. A user equipment (UE) for selecting an optimal discontinuous reception (DRX) configuration, wherein the UE comprises:

an integrated circuit comprising at least one processor;
at least one memory having a computer program code within the integrated circuit;
wherein the at least one memory and the computer program code with the at least one processor cause the UE to: characterize a packet delay as a function of a DRX cycle duration and a random variable, wherein the random variable indicates an inter-arrival time between packets; determine an expected delay for a plurality of packets based on at least one the random variable;
evaluate an on-duration of a DRX configuration for which the determined expected delay is less than a minimum of delay constraints of at least one application running in a background of the UE; and
compute an active time of the DRX configuration based on the evaluated on-duration and select the optimal DRX configuration with a minimum active time.

18. The UE as in claim 17, wherein said UE is configured to communicate said selected optimal DRX configuration to a radio access network (RAN).

19. The UE as in claim 17, wherein: the active time of the DRX configuration is computed by considering an effect of at least one timer of a communication network, and the at least one timer comprises: an in-activity timer, a retransmission timer and a round trip timer.

20. The UE as in claim 17, wherein said UE is configured to determine a minimum value of said DRX cycle duration for which probability of presence of at least one packet within a time interval is greater than a threshold from all available DRX configurations when arrival process of at least one packet among said plurality of packets is known to said UE, to determine said expected delay and evaluating said on-duration for which said expected delay is less than minimum of delay constraints of said at least one application running in background of said UE, and to compute said active time of said DRX configuration for said determined minimum value of DRX cycle duration.

* * * * *